United States Patent [19]
Johnson et al.

[11] 3,791,422
[45] Feb. 12, 1974

[54] SERVICE STATION GASOLINE VAPOR RECOVERY SYSTEM

[75] Inventors: Everette M. Johnson, Fishkill; Herbert E. Vermillion, Wappingers Falls; Robert S. Wetmiller, Fishkill, all of N.Y.

[73] Assignee: Texaco Inc., New York, N.Y.

[22] Filed: Nov. 11, 1971

[21] Appl. No.: 197,747

[52] U.S. Cl............... 141/11, 55/88, 55/174, 62/54, 141/45
[51] Int. Cl............................................. B65b 3/04
[58] Field of Search. 55/83, 174; 62/54, 55; 141/37, 141/44, 45, 52, 59, 192-229, 1-8, 11

[56] References Cited
UNITED STATES PATENTS 3,369,371 2/1968 Holly et al. ................. 62/54
3,664,093 5/1972 Murdock .................... 55/174

Primary Examiner—Bell, Jr. Houston S.
Attorney, Agent, or Firm—Thomas H. Whaley; Carl G. Ries

[57] ABSTRACT

The invention relates to apparatus and method to avoid pollution of the atmosphere due to the passage of gasoline fumes into the latter. The system functions in conjunction with a service station which in its operation transfers gasoline from a storage tank to a motor vehicle. The apparatus includes means to collect fumes from the vehicle tank simultaneous with the injection of liquid fuel to the latter. Thereafter the fumes are vaporized and separated from the air such that only the latter is passed to the atmosphere.

11 Claims, 3 Drawing Figures

PATENTED FEB 12 1974 3,791,422
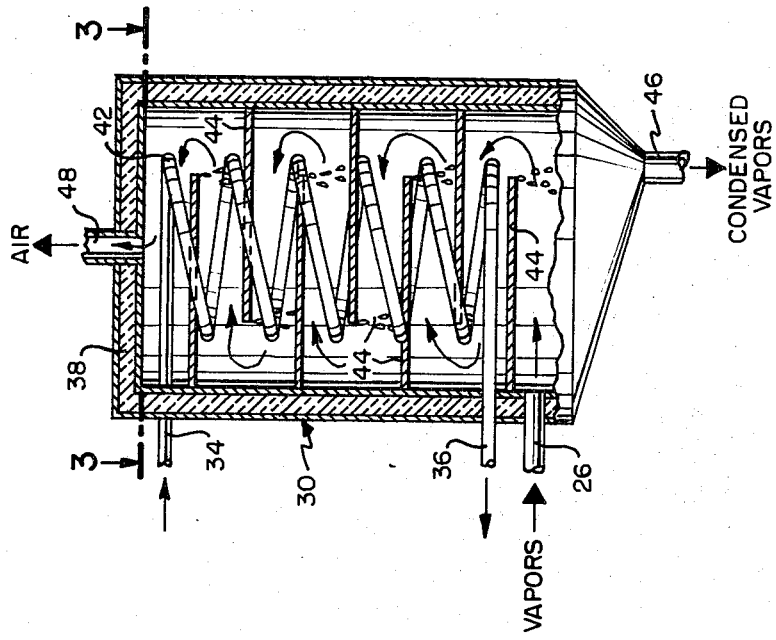
FIG. 2
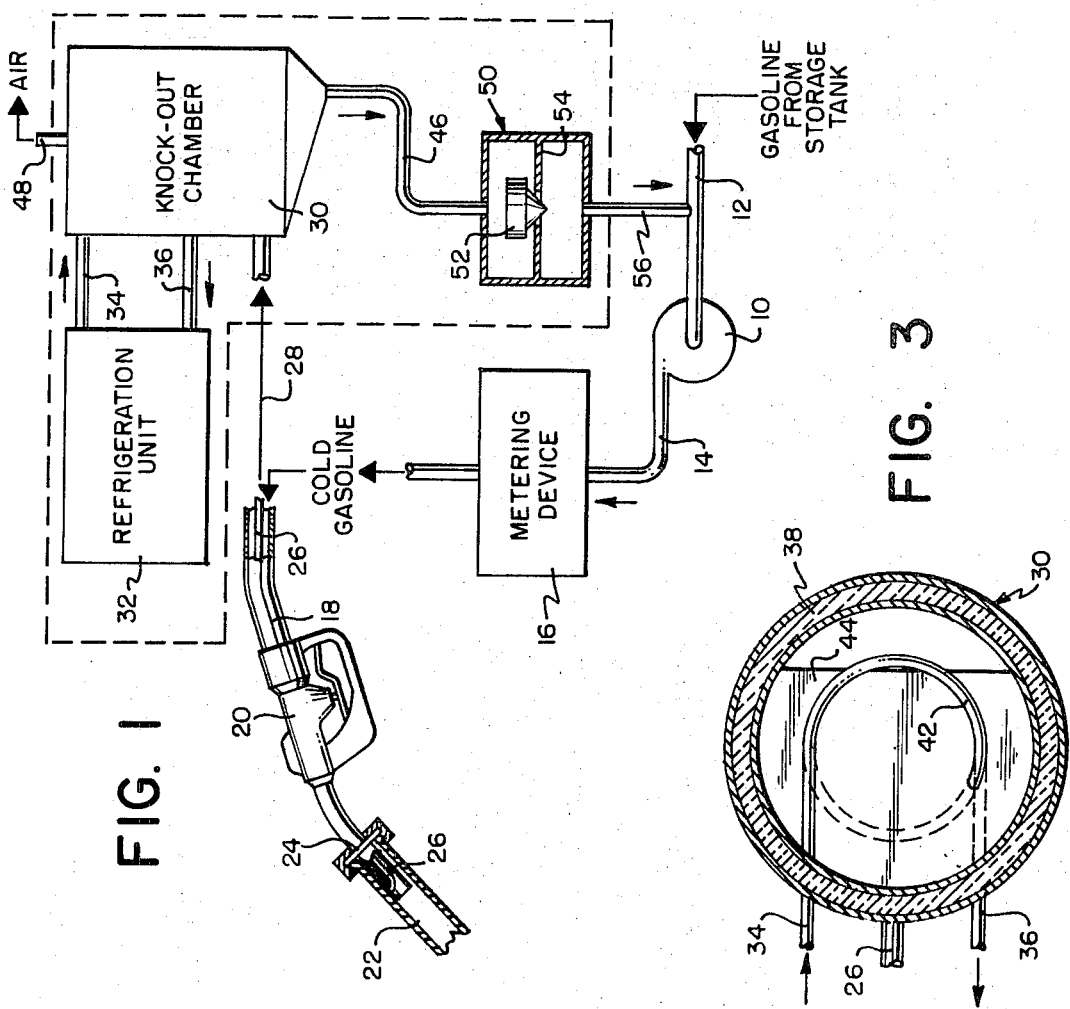
FIG. 3
FIG. 1

SERVICE STATION GASOLINE VAPOR RECOVERY SYSTEM

BACKGROUND OF THE INVENTION

Usually the fuel tank of a combustion engine is filled by use of a dispensing nozzle which discharges directly from a storage reservoir into the inlet pipe of an automobile fuel tank. During the liquid fuel flow, some release of the lighter volatile fuel fractions occurs in the form of a vapor which is displaced from the vehicle's tank by the inflowing liquid fuel. In cold weather this vapor flow can be a negligible amount. In hot weather however, substantial quantities of vapor are released to the atmosphere unless otherwise recovered.

Motor vehicles have been provided with means to receive vapors from the fuel tank and carburetor during operation and to recover them. The present invention however relates to that type of arrangement wherein vapor recovery during the fuel tank filling operation is effected in connection with a fuel dispenser such as found at a typical gasoline service station.

Accordingly, therefore, the present invention contemplates a fuel dispensing unit which incorporates means for recovering fuel vapors displaced from a tank. The vapors are then treated and reintroduced as fuel fractions back into the incoming liquid stream. Finally, air carried with the vapors is disposed of.

It is generally known that recovery of vaporized liquid fuel fractions can be effected by substantially condensing the vapor and reintroducing it into the inflowing, relatively cool fuel stream.

Such systems are found to operate fairly effectively because of the normally existing, substantial temperature differential (at warm, ambient temperatures) between the temperature of the vehicle fuel tank and the temperature in the normally underground gasoline supply tank which feeds the fuel dispensing mechanism or pump. Thus, it must be remembered that at high summer temperatures the coolant air which moves past the radiator and the engine of a motor vehicle, ultimately flows downwardly beneath the vehicle and passes in continuous heat exchange with the fuel tank. In addition, heat radiated from road surfaces contributes to raising fuel tank temperatures. Therefore, tank temperatures of 110° F. and above are not at all unusual. In contrast, temperatures of the upcoming liquid fuel from a subterranean tank may typically be in the neighborhood of 60° F. and below.

In summary, substantial condensation of the warm fuel vapors, followed by injection into the cooler liquid stream, results in substantial absorption of the vapors.

Ordinarily, filling of a vehicle's fuel tank is accomplished by providing a dispensing nozzle which removably engages the inlet pipe of said fuel tank. The dispensing nozzle, upon actuation, permits fuel vapors within the tank to be displaced by the incoming fuel, to flow up the tank fill pipe and hence be discharged to the atmosphere where they contribute to air pollution.

The present invention contemplates a recovery system in an adjunctive unit applicable to a gasoline dispensing pump having a number of important features. First, the dispensing nozzle is arranged for tight or sealing engagement with a vehicle fuel tank. Furthermore, the stream of liquid fuel which is supplied under substantial pressure to the nozzle, is caused to flow countercurrently to a vapor return line and in heat exchange relationship thereto.

The present invention utilizes a vapor recovery system which is dependent upon externally powered refrigeration to effect further condensation of the fuel vapors for return of the latter to the fuel supply. Also, the invention, as above intimated, particularly contemplates a fuel dispensing hose or conduit so constructed as to provide separate fluid conduits. One such conduit receives the main flow of liquid fuel to the nozzle and directs it thence to the tank. The other or second conduit conducts the vapors in a reverse direction back to the dispensing unit. Preferably, this dispensing hose is constructed to return the vented vapors coaxially and centrally of the main flow of fuel which occurs in an annular channel thereabout, thus effecting a degree of preliminary heat exchange.

Condensation of the residual fuel vapors is thereafter concluded in a refrigerated column from which the excess air readily separates and passes to the atmosphere. Resulting liquefied fuel is returned through a suitable density valve to the inlet or suction side of the pump connected to the fuel storage tank or reservoir.

To illustrate the present invention in greater detail, reference is made to one specific embodiment thereof from which the general principles can be readily understood. This embodiment is disclosed in the figures of the present drawing wherein:

FIG. 1 is a more or less diagrammatic representation of the system.

FIG. 2 is a sectional elevation view taken through a cooling unit for condensing fuel vapors.

FIG. 3 is a sectional view taken along line 3—3 of FIG. 2.

FIG. 1 shows the present invention, in highly diagrammatic form, associated with the main essential elements of a fuel dispenser. These elements are shown at the lower and left hand portion of FIG. 1, starting with the standard typical fuel pump 10, which is positioned with its suction inlet 12 communicated with an underground gasoline storage tank or reservoir.

Fuel pump 10, which operates for example, at a typical pressure of about 25 psig, discharges via pipe 14, through the meter and computer 16, to the flexible hose 18, and thence to dispensing nozzle 20. The latter is provided with means such as a peripheral collar 21 to sealingly engage inlet pipe 22 of the fuel tank as at 24.

A feature of the present invention comprises a relatively small bore vapor release, second conduit 26, disposed internally of the first conductor flexible hose 18. Said conduit 26 by its position, is in countercurrent heat exchange relationship with the flow of liquid fuel passing through flexible hose 18 when nozzle 20 is actuated to the open position. Conduit 26 is preferably flexible, and can be periodically supported within hose 18, although it can also be unsupported and still achieve the desired heat transfer function.

Said conduit 26 extends longitudinally of hose 18, passes through nozzle 20, and terminates at the nozzle spout as shown in FIG. 1. The conduit end is in constant communication with the interior of inlet tube 22 of the fuel tank, and therefore with the atmosphere within the fuel tank itself.

Referring more specifically to the vapor recovery system, the latter is represented by embodying the elements enclosed within the area bounded by the dash lines shown in FIG. 1. Vapor carrying conduit 26 leaves hose 18 at the juncture with the regular dispensing unit, and passes as indicated by the solid line 28, into knockout chamber 30. Said knockout chamber 30 encloses a low temperature refrigerant circulating coil or other heat exchange member 42 communicated with refrigerating unit 32, which delivers cold refrigerant through line 34 and returns it through line 36.

Knockout chamber or column 30 as shown more in detail in FIGS. 2 and 3, is preferably defined by cylindrical walls and upper and lower closure panels. Desirably chamber 30 is provided with a substantial thickness of lagging or insulation 38 so that a low temperature is maintained within the chamber.

Functionally, chilled refrigeration is conducted through pipe 34, and in the example shown, flows downwardly through helical coil 42. The refrigerant thus passes in counterflow relation to the upward flowing fuel vapor and air mixture received from the vehicle tank. The vapors meanwhile, have been introduced through pipe 26 at the lower end of the tower 30, whereby to effect a maximum contact of the upflowing vapors with the chilled surface of coolant coil 42. In the example shown, counterflow between refrigerant and vapors is employed; cocurrent flow, cross flow or combinations can similarly be employed if desired.

Column 30 is provided with oppositely directed and overlapping baffles 44, to form a serpentine passage through the column and increase residence time for maximum heat exchange. Thus, vapors pass through the tortuous or zigzag path, indicated by the arrows therein, meanwhile contacting coils of progressively decreasing temperature. Therefore, the cool portion of the rising vapor stream is at the top of the column, whereas condensed liquefied fuel reaches the column lower end adjacent the warmer end of coolant coil 42. Other mechanical arrangements to accomplish the same condensation objective can be used depending upon the refrigerant-vapor flow chosen as described earlier.

The cooled liquid then flows down into a sump, or out of the chamber by way of line 46. Residual air from which essentially all of the fuel vapors have been condensed, is discharged to the atmosphere by way of vent pipe 48.

Referring now to FIG. 1, it will be seen that pipe 46 discharges condensed liquid fuel or hydrocarbons, directly into a density valve chamber 50. Said valve comprises a float member 52 which is operably connected to readily engage a valve seat 54. Therefore, when condensed fuel vapor is accumulated sufficiently to raise valve 52 upwardly from its seat, said liquid flows downwardly through pipe 56 into the pipe 12 on the suction side of the pump 10 or alternately into the gasoline storage tank.

Operationally, as the liquid fuel is urged under pressure from a storage reservoir therefor into tank inlet pipe 22, a mixture of warm air and fuel vapors is displaced from the latter. The mixture passes upwardly via second conduit 26, through the flexible dispensing hose 18, and into knockout tower 30. In said tower the vapors are condensed and returned to intermix with relatively cool gasoline from the storage tank. At least some of the fuel vapors will be condensed as a result of heat exchange with incoming fuel, which condensate will flow from conduit 26 and into inlet 22. The major part of the fuel however will pass in a partially cooled condition into knockout drum 30. In the latter, contact with the refrigerating agent will cause the remainder of fuel vapor content to condense out of the mixture, leaving only air.

While the refrigerating element is shown as only a cooling coil, it is appreciated that the refrigerating system is controllably operated to maintain a desired temperature range in chamber 30 to condense the fuel vapor component only.

Chamber 30 is preferably maintained at atmospheric pressure by means of vent 48 whereby to direct air from the chamber free of pollutant gases.

Other modifications and variations of the invention as hereinbefore set forth may be made without departing from the spirit and scope thereof, and therefore, only such limitations should be imposed as are indicated in the appended claims.

We claim:

1. In a system for dispensing a volatile fuel wherein the fuel in the liquid state is transferred from a storage reservoir to a fuel tank holding liquid fuel as well as a mixture of air and fuel vapors, and including;

a fuel dispensing nozzle having a spout that is removably engageable with said fuel tank to form a closed system therewith, first conduit means communicating said fuel dispensing nozzle with said fuel storage reservoir, a liquefaction chamber including passage means defined therein having inlet and outlet ports respectively and a cooling element disposed within said passage means intermediate said inlet and outlet ports, for contacting incoming air-fuel mixture for liquefying the fuel and separating air from said mixture, a second conduit means opening into said nozzle spout to receive said mixture of air and fuel vapors forced from said tank as liquid fuel is introduced to the latter during a tank filling operation, said second conduit means being communicated with said passage means in said liquefaction chamber, whereby to contact said air and fuel vapor mixture with said cooling element to liquefy the fuel and separate air therefrom.

2. In a system as defined in claim 1, where at least a portion of said second conduit means is disposed in heat exchange relationship with said first conduit means for effecting heat exchange of the liquid fuel, and said air-fuel vaporous mixture.

3. In a system as defined in claim 2, wherein said portion of said second conduit means is disposed internally of said first conduit means to effect said heat exchange.

4. In a system as defined in claim 2, wherein said portion of said second conduit means is supportably disposed internally of said first conduit means to define an annular passage between the respective first and second conduit means.

5. In a system as defined in claim 1, including; valve means connected downstream of said liquefication chamber for regulating the flow of liquefied fuel from the latter.

6. In a system as defined in claim 5, wherein the downstream side of said valve means is communicated with said storage reservoir for passing liquid fuel to the latter.

7. Recovery method for avoiding pollution of the atmosphere by the passage of air-fuel mixture from a volatile liquid fuel during transfer thereof from the fuel storage reservoir to a fuel tank therefor, which includes the steps of;
- forming a removable seal connection between said fuel storage reservoir and said fuel tank,
- passing a stream of said volatile liquid fuel from said storage reservoir to said fuel tank simultaneously directing a vaporized flow of air-fuel mixture from said tank, and
- liquefying the fuel component of said vaporous mixture and separating said fuel component therefrom.

8. In the method as defined in claim 7, including the step of initially cooling said air-fuel mixture with liquid fuel prior to the liquefication thereof.

9. In the method as defined in claim 7, including the step of; contacting said mixture of air and fuel vapors with said stream of volatile liquid fuel subsequent to displacement of a mixture from said fuel tank.

10. In the method as defined in claim 9, including the step of; further refrigerating said air-fuel mixture subsequent to the initial cooling thereof to a temperature less than the liquefication temperature of said fuel component over said mixture.

11. In the method as defined in claim 9, wherein said air and fuel vapor mixture and said liquid fuel are passed in countercurrent heat exchange relationship.

* * * * *